United States Patent [19]

Boldebuck et al.

[11] 4,215,157

[45] Jul. 29, 1980

[54] PROCESS FOR PREPARING POLYETHERIMIDE COATINGS

[75] Inventors: Edith M. Boldebuck, Schenectady; Eugene G. Banucci, Scotia, both of N.Y.

[73] Assignee: General Electric Company, Schenectady, N.Y.

[21] Appl. No.: 965,192

[22] Filed: Nov. 30, 1978

Related U.S. Application Data

[62] Division of Ser. No. 778,858, Mar. 18, 1977, Pat. No. 4,157,996.

[51] Int. Cl.$^2$ ............................................. B05D 5/12
[52] U.S. Cl. ........................... 427/116; 174/110 SR; 174/120 SR; 427/117; 427/120; 427/178; 427/388.2; 427/388.4; 427/388.5; 427/388.1; 427/389.9; 427/422; 427/428; 427/429; 427/435; 428/371; 428/458; 428/474; 428/920; 528/26; 528/125; 528/183; 528/185; 528/188; 528/208; 528/226
[58] Field of Search ............... 428/458, 474, 920, 371; 427/178, 390 R, 422, 429, 435, 428, 116, 117, 120, 388 R, 388 A, 388 C, 388 D; 174/110 SR, 120 SR; 335/299; 528/26, 125, 183, 185, 188, 208, 226

[56] References Cited

U.S. PATENT DOCUMENTS

| | | | |
|---|---|---|---|
| 3,440,197 | 4/1969 | Boldebuck et al. | 260/29.2 |
| 3,518,219 | 6/1970 | Lavin et al. | 260/33.4 |
| 3,563,951 | 2/1971 | Rademann et al. | 528/26 |
| 3,677,921 | 7/1972 | Stivers | 427/117 X |
| 3,801,393 | 4/1974 | Bilow | 174/120 SR |
| 3,905,942 | 9/1975 | Takekoshi et al. | 528/179 |
| 4,048,142 | 9/1977 | Takekoshi | 528/179 X |

OTHER PUBLICATIONS

Assarsson et al., ACS "Adv. in Chem." vol. 84 (1967) pp. 1–11 Interaction of Water with Alkyl Substituted Amides.

Primary Examiner—Michael F. Esposito
Assistant Examiner—Thurman K. Page
Attorney, Agent, or Firm—Richard G. Jackson; James C. Davis, Jr.; Paul R. Webb, II

[57] ABSTRACT

Disclosed is a solution including an aromatic bis (ether dicarboxylic acid) component, an organic diamine component and a solvent system including a water-soluble organic solvent component, which may be a dipolar aprotic solvent or a monoalkyl ether of ethylene glycol or of diethylene glycol, and optionally water. The solution may be coated on a substrate and polymerized to form high quality polyetherimide coatings.

26 Claims, No Drawings

PROCESS FOR PREPARING POLYETHERIMIDE COATINGS

This is a division, of application Ser. No. 778,858, filed Mar. 18, 1977, now U.S. Pat. No. 4,157,996.

This invention relates to a coating solution of polyetherimide-forming monomers in a solvent system including an organic solvent and optionally water as components thereof.

U.S. Pat. No. 3,440,197 (Edith M. Boldebuck and Fred F. Holub) discloses coating solutions prepared from a mixture of an aromatic polycarboxylic acid and an aromatic diamine dissolved in a solvent mixture comprising water and a water-soluble monofunctional secondary or tertiary amine, wherein the concentrations are in the range from 5 to 50 percent, by weight, reactants and 50 to 95 percent, by weight, solvent mixture. Although the coating solutions are capable of being converted by the application of heat to high temperature protecting and insulating films, a substantial amount of energy is required to remove the relatively high amount of solvent mixture in the process of forming the films.

U.S. Pat. No. 3,518,219 (Lavin et al.) discloses a high solids solution of particular polyimide-forming monomeric reactants, viz., a polyamine and a tetracarboxylic acid formed from two molecules of trimellitic anhydride joined through their free carboxylic groups, in various inert organic liquids, such as lower alkyl alcohols, acetone, methyl ethyl ketone, cresol, toluol, N-methylpyrrolidone, dimethylacetamide, dimethylformamide, etc. Lavin et al. also disclose that mixtures of water with acetone and ethyl alcohol may be used where the solubility of the particular monomers permit. However, the tetracarboxylic acid and polyimides formed therefrom are highly susceptible to hydrolytic degradation of the ester linkage.

U.S. Pat. No. 3,905,942 (Takekoshi and Kochanowski) discloses a method for making polyetherimides involving reaction of aromatic bis(etherdicarboxylic acid)s and organic diamines in the presence of a nonpolar organic solvent or phenolic solvent at temperatures of at least 130° C. It is known that the viscosities of amide-rich aqueous systems of various amides, for example N-methyl pyrrolidone, N,N-dimethylformamide, and N,N-dimethylacetamide, are higher than the viscosities of the corresponding amides, as shown by Assarson et al., Advances in Chemistry, Vol. 84, pages 1-11 (American Chemical Society).

It has now been found by practice of the present invention that coating solutions of aromatic bis(ether dicarboxylic acid)s and organic diamines can be prepared in environmentally acceptable solvent systems including inert organic liquids and optionally water as components thereof. Advantageously, the solutions can be prepared at temperatures below 100° C., including room temperature. The coating solutions, which may include the monomeric reactants in high concentrations, typically are characterized with good stability against change in composition and viscosity. The solutions may be coated on substrates and subsequently heated to remove the solvent system and form high quality polyetherimide coatings, which typically have good thermal stability and excellent flexibility.

Generally stated, the coating solution of the present invention includes (1) an aromatic bis(ether dicarboxylic acid) having the formula,

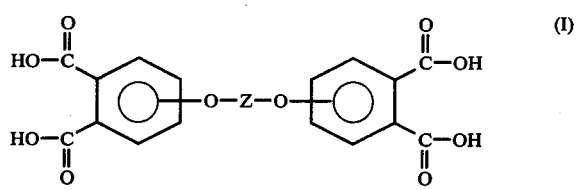

where Z is a member selected from the class consisting of (A) divalent organic radicals having the following formulas,

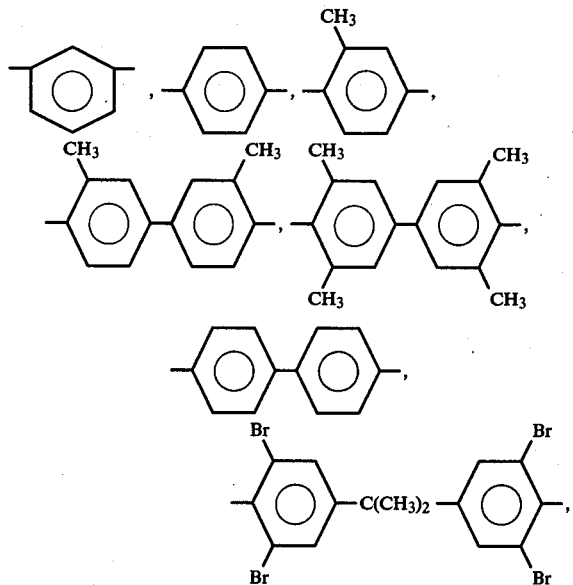

and (B) divalent organic radicals of the general formula,

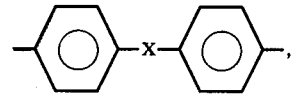

where X is a member selected from the class consisting of divalent radicals of the formulas,

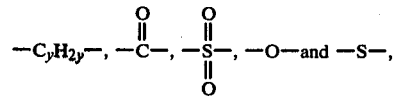

where y is an integer from 1 to 5;

(2) an organic diamine having the formula, $$H_2N—R—NH_2, \qquad (II)$$

where R is a divalent organic radical selected from the group consisting of divalent aromatic hydrocarbon radicals having from 6 to 30 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane, and divalent radicals of the general formula,

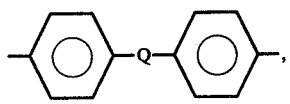

where Q is a member selected from the class consisting of

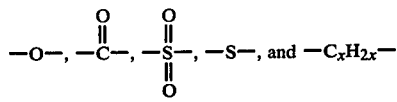

and x is an integer from 1 to 5; and (3) a solvent system comprising (i) a water-soluble organic solvent component which is inert to the above monomeric components and optionally (ii) water. If desired, the combined amount of the diamine and the bis(ether dicarboxylic acid) component may be more than 50 percent by weight of the combined weight of the diamine, the bis(ether dicarboxylic acid) component, and the organic solvent component.

Aromatic bis(ether dicarboxylic acid)s (hereinafter referred to as tetra-acids) of formula I include, for example:

1,3-bis(2,3-dicarboxyphenoxy)benzene;
1,4-bis(2,3-dicarboxyphenoxy)benzene;
1,3-bis(3,4-dicarboxyphenoxy)benzene;
1,4-bis(3,4-dicarboxyphenoxy)benzene.

A preferred class of aromatic bis(ether dicarboxylic acid)s included by formula I includes compounds of formulas III to V, which follow:

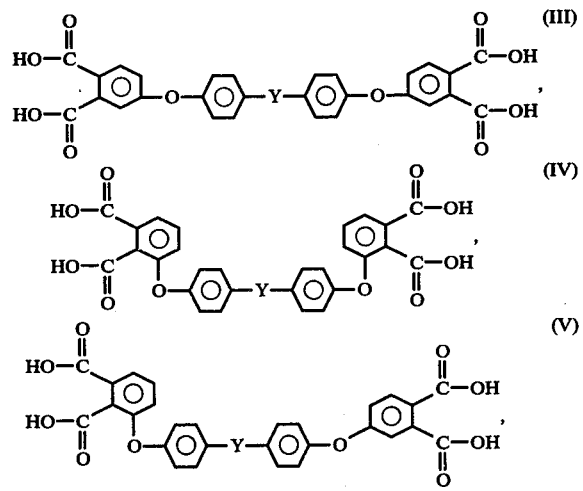

and mixtures thereof, where Y is selected from the class consisting of —O—, —S—,

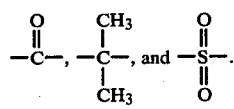

Aromatic bis(ether dicarboxylic acid)s of formula III include, for example:

2,2-bis[4-(3,4-dicarboxyphenoxy)phenyl]propane;
4,4'-bis(3,4-dicarboxyphenoxy)diphenyl ether;
4,4'-bis(3,4-dicarboxyphenoxy)diphenyl sulfide;
4,4'-bis(3,4-dicarboxyphenoxy)benzophenone;
4,4'-bis(3,4-dicarboxyphenoxy)diphenyl sulfone;
and mixtures thereof.

Aromatic bis(ether dicarboxylic acid)s of formula IV include, for example:

2,2-bis[4-(2,3-dicarboxyphenoxy)phenyl]propane;
4,4'-bis(2,3-dicarboxyphenoxy)diphenyl ether;
4,4'-bis(2,3-dicarboxyphenoxy)diphenyl sulfide;
4,4'-bis(2,3-dicarboxyphenoxy)benzophenone;
4,4'-bis(2,3-dicarboxyphenoxy)diphenyl sulfone;
and mixtures thereof.

The aromatic bis(ether dicarboxylic acid) of formula V may be, for example, 4-(2,3-dicarboxyphenoxy)-4'-(3,4-dicarboxyphenoxy)-diphenyl-2,2-propane.

Aromatic bis(ether dicarboxylic acid)s especially preferred herein are:

2,2-bis[4-(3,4-dicarboxyphenoxy)phenyl]propane;
2,2-bis[4-(2,3-dicarboxyphenoxy)phenyl]propane;
4-(2,3-dicarboxyphenoxy)-4'-(3,4-dicarboxyphenoxy)diphenyl-2,2-propane; and mixtures thereof.

Some of the aromatic bis(ether dicarboxylic acid)s of formula I are shown in U.S. Pat. No. 3,972,902 (Darrell Heath and Joseph Wirth). As described therein, the bis(ether dicarboxylic acid)s can be prepared, for example, by reacting a nitro-substituted phenyl dinitrile with a metal salt of a dihydric phenol compound in the presence of a dipolar aprotic solvent to form a tetranitrile, followed by conversion of the tetranitrile to tetra-acid by treating with potassium hydroxide in aqueous methanol.

The organic diamines of Formula II include, for example:

m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
benzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide, N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane,
and mixtures of such diamines.

Organic diamines preferred herein are m-phenylene diamine; 4,4'-oxydianiline; 4,4'-methylenedianiline; and mixtures thereof.

The organic solvent component may be a water-soluble dipolar aprotic solvent, a monoalkyl ether of ethylene glycol having from 1 to about 4 carbon atoms in the alkyl group, a monoalkyl ether of diethylene glycol having from 1 to about 4 carbon atoms in the alkyl group, or mixtures thereof. Suitable dipolar aprotic solvents include, for example, N-methyl-2-pyrrolidone, N,N-dimethylformamide, N,N-dimethylacetamide, dimethylsulfoxide, tetramethylurea, mixtures thereof and the like. Suitable monoalkyl ethers of ethylene glycol include, for example, methyl cellosolve, ethyl cellosolve, propyl cellosolve, butyl cellosolve, mixtures thereof, and the like. Suitable monoalkyl ethers of diethylene glycol include methyl carbitol, ethyl carbitol, propyl carbitol, butyl carbitol, mixtures thereof, and the like. Solvents preferred herein are methyl carbitol, mixtures of methyl carbitol and butyl carbitol, and N-methyl pyrrolidone.

In general, the organic diamine component may be included in an amount of from about 0.5 mole to about 2.0 moles, preferably from about 1 to about 1.3 moles, per mole of aromatic bis(ether dicarboxylic acid) component. Where more than one compound is included in a component of the present solution, the parts, moles, or other quantity of such component is taken as the sum of the parts, moles, or such other quantity, respectively, of each compound included in such component. Thus, for example, a solution including as the only monomeric reactants, 2.5 moles of 4,4'-methylene dianiline, 1.5 moles of 4,4'-bis[4-(3,4-dicarboxyphenoxy)phenyl]propane and 0.5 mole of 4,4'-bis[4-(2,3-dicarboxyphenoxy)phenyl]propane has a ratio of 1.25 moles of organic diamine component per one mole of the bis(ether dicarboxylic acid) component.

The organic diamine component and the aromatic bis(ether dicarboxylic acid) component may be included in the solution in any amounts up to the combined limit of solubility thereof in the solvent system. The combined amount of the monomeric reactants, i.e. the diamine component and the bis(ether dicarboxylic acid) component, present in the solution may be, for example, from about 0.1 or less to about 3 or more parts by weight, per one part by weight of the organic solvent component. Preferably, the monomeric reactants are present in a total amount of at least 0.67 part by weight per one part by weight of the organic solvent component.

Solutions having high ratios of monomeric reactants to organic solvent component advantageously minimize the amount of organic solvent released during subsequent formation and cure of polyetherimide resins as in coating operations. Such solutions having high amounts of monomeric reactants may have higher viscosities than desired for some coating applications. Typically, inclusion of water decreases the solution viscosity. A given decrease in viscosity may be effected using a lower amount of added water relative to the amount of added organic solvent component which would be required to effect the same viscosity decrease. Moreover, dissolving X amount of water in the solution effects a greater decrease in the viscosity of the solution than the decrease obtained by dissolving X amount of additional organic solvent therein.

Water may be present in any amount up to the maximum amount at which the solution is substantially free of precipitate. Although water is miscible with the organic solvent component in substantially all proportions, inclusion of too much water in the present monomeric solution results in precipitate or other plural-phase formation. The amount of water which may be present depends on the particular bis(ether dicarboxylic acid) and diamine components, the particular organic solvent component, and the weight ratio of monomeric reactants to organic solvent.

Advantageously, the present coating solutions may include the monomeric reactants in a combined amount of 40 or more percent, e.g. from 40 to about 75 or more percent by weight based on the weight of the solution. In general, such high monomer content solutions, including water as may be required, have suitable viscosities in the temperature range, e.g. about 20° to about 40° C., normally used in metal conductor (e.g. wire) enameling operations for employment therein. Heretofore known polyetherimide-forming wire enameling solutions typically contain 15–25 percent by weight polyether-amide-acid polymer in organic solvents, wherein the polymer concentration is limited to the indicated low amounts due at least in part to the often unacceptably high viscosity of more highly concentrated polymer solutions. Advantages of the present more highly concentrated monomeric solutions include less total solvent to be removed in preparing coatings, lower energy consumption for solvent removal, and less organic solvent to be disposed of in such removal.

The solution may be prepared by mixing the various components, as by stirring, until the monomeric diamine and bis(ether dicarboxylic acid) components are dissolved. In general, the various components may be added in any sequence. If desired, the monomeric reactant components may be dissolved in the organic solvent component, followed by adding water with stirring until a desired decrease in viscosity is effected. However, solutions including water are more easily prepared by adding the monomeric reactant components with stirring to a solution of the water and organic solvent component. Preparation of the solution is generally accelerated at elevated temperatures. In general, it is preferred that the preparation temperature not exceed the boiling point of water at the pressure employed.

The liquid coating solutions of the present invention have many and varied uses. The coating solutions may be applied to a variety of substrates using any suitable coating method, e.g. dipping, brushing, spraying, wiping and the like, and thereafter heated to evaporate the solvent system and form cured polyetherimide resinous coatings. The temperature is preferably increased gradually to produce smooth resinous coatings. The polyetherimide-forming reaction proceeds advantageously at a temperature of from about 125° C. to about 300° C. or more.

The present coating solutions may be employed as wire enamels to form resinous insulating coatings on copper and aluminum wire, as varnishes for coating or impregnating various substrates such as coils of previously insulated wire (e.g. in motor and generator coils), woven and non-woven fabrics, etc. Additives, e.g. light stabilizers, oxidation inhibitors, surfactants etc., may be included in the present coating solutions.

For utilization as wire enamels, the present coating solutions desirably have a viscosity from about 200 to about 10,000, preferably from about 500 to about 2500, centistokes at 25° C.

The coating solutions may be applied immediately upon preparation or stored prior to use. In general, maximum storage life can be obtained by storing the solutions under a nitrogen blanket in the absence of light.

Practice of the present invention is further illustrated by the following non-limiting examples. All parts and percentages given throughout this description and in the appended claims are by weight unless indicated otherwise.

general, the dipolar aprotic organic solvents contained not more than about one percent (estimated) water based on the weight of the solvent. The various glycol ether solvents may have contained more water, e.g. up to about 10 percent water based on the weight of the solvent.

EXAMPLES 1-6

Solutions of the present invention including 2,2-bis[4-(3,4-dicarboxyphenoxy)phenyl]propane (a tetra-acid) as the aromatic bis(ether dicarboxylic acid) component and 4,4'-methylene dianiline (MDA) as the organic diamine were prepared in solvent mixtures of water and the organic solvents set out in Table I below. The relative amounts of the various ingredients are also set forth in Table I.

TABLE I

|  | Example Number | | | | | |
|---|---|---|---|---|---|---|
|  | 1 | 2 | 3 | 4 | 5 | 6 |
| Ingredients | | | | | | |
| Monomers | | | | | | |
| 4,4'-BPATA[a], wt. % | 39.3 | 24.1 | 48.3 | 39.5 | 37.8 | 39.4 |
| MDA[b], wt. % | 17.5 | 9.0 | 21.6 | 15.7 | 15.0 | 15.7 |
| Total monomers, wt. % | 56.8 | 33.1 | 69.9 | 55.2 | 52.8 | 55.1 |
| Organic solvent[c], wt. % (type) | 29.1(NMP) | 32.2(NMP) | 17.9(NMP) | 29.3(DMF) | 32.4(DMSO) | 29.5(TMU) |
| Water, wt. % | 14.1 | 34.7 | 12.1 | 15.4 | 14.7 | 15.4 |
| Ratios | | | | | | |
| moles MDA/mole 4,4'-BPATA | 1.25 | 1.05 | 1.25 | 1.12 | 1.12 | 1.12 |
| parts total monomers/part organic solvent | 1.95 | 1.03 | 3.91 | 1.88 | 1.63 | 1.87 |

[a] 4,4'-BPATA is 2,2-bis[4-(3,4-dicarboxyphenoxy)phenyl]propane having the formula

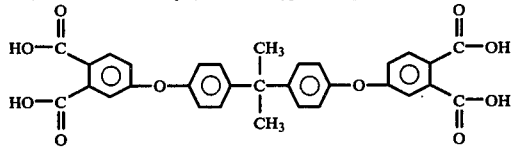

[b] MDA is 4,4'-methylene dianiline
[c] NMP is N-methyl-2-pyrrolidone; DMF is N,N-dimethylformamide; DMSO is dimethylsulfoxide; TMU is tetramethylurea In the following examples, film flexibility was determined using a bend-and-crease test wherein a cured resin film is folded over on itself through an angle of 180° and the fold is then creased by normal pressure from the fingers. Films which do not break in this test have good flexibility and pass the test. Cut-through temperatures in the examples were determined by a test wherein a cured film is placed between two bare copper wires crossed at a 90° angle in a cut-through apparatus commonly employed by the electrical industry in the evaluation of enameled magnet wire J. A. N.-W-583 (7 Apr. 1948). The copper wires are electrically insulated from a metal base plate by 5-mil mica sheet. The test apparatus is then placed in an air circulating over with the copper wires connected to a 110-volt AC circuit containing an alarm system. A 1000 gram-load is placed on the crossed wire pair. The loaded film resting between the crossed wires is heated in an air circulating oven at a rate of about 10° C. per minute. The cut-through temperature is the temperature at which the crossed wires short circuit, i.e., electrical contact is made between the wires through the film, as indicated by activation of the alarm. Solution viscosities were measured using a capillary viscometer in a water bath maintained within 0.05° C. of the indicated temperature.

The organic solvents used in the examples were technical or practical grade solvents, unless otherwise indicated, and accordingly the indicated amounts thereof include minor amounts of water and other impurities. The amounts of water set forth in the examples are for the water, if any, added in preparing the solutions. In In each of these examples, the substantially dry tetra-acid (4,4'-BPATA) and diamine (MDA) reactants were added to a flat bottom glass container, followed by adding the water and organic solvent. After the additions were made, the container was tightly stoppered with a cork and placed on a hot plate maintained at a surface temperature of about 130° C. Within a short time, i.e., within about 15 minutes, the thus warmed ingredients formed a homogeneous solution at a temperature below 100° C. Thereafter, the container was removed from the hot plate and allowed to cool to room temperature (about 20° C. to 30° C.). Condensed water vapor or other condensate, if any, on the upper wall of the container was admixed with the solution by tipping the stoppered container on its side and rotating the container until the ingredients were uniformly mixed throughout.

Each of the resulting clear homogeneous solutions was stored at room temperature in its respective tightly stoppered glass container and observed periodically for stability, i.e., absence of precipitate or other two-phase formation. The results of these observations are set out in Table II as "shelf life", i.e., the period of time throughout which each solution remained homogeneous with no observed precipitate or other two-phase formation.

The qualitative viscosity of each solution as observed prior to any observed two-phase formation therein is also set forth in Table II.

A portion of each homogeneous solution was cast on a glass substrate and the resulting cast films were heated in a hot air oven using the following heating sequence: 30 minutes at 125°–150° C., 30 minutes at 200° C., 30 minutes at 250° C., and 30 minutes at 300° C. The resulting cured polymeric films, which were 2 to 3 mils in thickness and substantially free of bubbles and voids, were removed from the glass substrate and tested for flexibility and cut-through temperature. As shown by the data in Table II, films prepared from all the solutions had excellent flexibility and advantageously high cut-through temperatures.

TABLE II

| | Example Number | | | | | |
|---|---|---|---|---|---|---|
| | 1 | 2 | 3 | 4 | 5 | 6 |
| Solution Properties | | | | | | |
| Shelf life[a], weeks | >11 | >11 | >11 | 0.3 | 5 | >5 |
| Viscosity | Moderately viscous | very fluid | very viscous | moderately viscous | moderately viscous | moderately viscous |
| Film[b] Properties | | | | | | |
| Flexibility[c] | excellent | excellent | excellent | excellent | excellent | excellent |
| Cut-through temperature[d], °C. | 350 | — | — | 300 | 375 | 320 |

[a]The period of time throughout which each solution remained clear and homogeneous with no observed precipitate or other two-phase formation
[b]All films were 2–3 mils in thickness
[c]Determined by bend-and-crease test described in text preceding Examples 1–6
[d]Determined for sample film between 50-mil crossed wires by test described in text preceding Examples 1–6

EXAMPLE 7

This example illustrates an unsuccessful attempted preparation of a liquid coating solution using 2,2-bis[4-(3,4-dicarboxyphenoxy)phenyl]propane dianhydride (4,4'-BPADA) as a substitute for all the corresponding tetra-acid (4,4'-BPATA) in the formulation of Example 1 (see Table I). That is, the solution preparation procedure of Example 1 was repeated except that the 4,4'-BPATA was replaced by an equimolar amount of 4,4'-BPADA, the mole ratio of 4,4'-methylene dianiline (MDA) to 4,4'-BPADA being 1.25:1. However, instead of preparing a liquid coating solution, an opaque, sticky, putty-like polymeric paste resulted.

EXAMPLE 8

This example illustrates an unsuccessful attempted preparation of a liquid coating solution using 2,2-bis[4-(3,4-dicarboxyphenoxy)phenyl]propane dianhydride (4,4'-BPADA) as a substitute for all the corresponding tetra-acid (4,4'-BPATA) in the formulation of Example 2 (see Table I). That is, the solution preparation procedure of Example 2 was repeated except that the 4,4'-BPATA was replaced by an equimolar amount of 4,4'-BPADA, the mole ratio of 4,4'-methylene dianiline (MDA) to 4,4'-BPADA being 1.05:1.

The resulting composition was a heterogeneous two-phase system consisting of a sticky nonuniform semisolid polymeric phase dispersed in a liquid phase. This system was judged unable to form acceptable coatings.

EXAMPLE 9

A 50 percent monomer solution in N-methylpyrrolidone (NMP) was prepared as follows: To 2.33 grams of NMP containing a minor amount (about 0.05 to 0.1 percent) of water were added with stirring 1.610 grams (0.0029 mole) of 2,2-bis[4-(3,4-dicarboxyphenoxy)phenyl]propane (4,4'-BPATA) and 0.718 gram (0.00363 mole) of 4,4'-methylene dianiline (MDA). The 4,4'-BPATA tetra-acid dissolved slowly. Stirring was continued for 3–4 hours, during which time the mixture of ingredients was heated to 45° C. and maintained thereat, resulting in formation of a clear, homogeneous, moderately viscous solution (hereinafter referred to as Solution A) having a viscosity of 1960 centistokes at 25° C.

A 1.510-gram portion of Solution A was diluted by adding 0.38 gram of NMP with stirring to form a second clear homogeneous 40 percent monomer solution (hereinafter referred to as Solution B) containing a total of 0.67 part by weight of the 4,4'-BPATA and MDA monomeric reactants per one part by weight of NMP. Solution B was very fluid (viscosity of 189 centistokes at 25° C.).

Another 1.510-gram portion of Solution A was diluted by adding 0.375 gram of water with stirring to form another clear homogeneous 40 percent monomer solution (hereinafter referred to as Solution C) containing a total of 0.67 part by weight of the 4,4'-BPATA and MDA monomeric reactants per one part by weight of the NMP-water solvent mixture (2 parts of NMP per part of water) and a total of one part of the reactants per one part of NMP. Solution C was unexpectedly more fluid than Solution B and had a viscosity of 93 centistokes at 25° C.

NMP containing a minor amount (about 0.05 to 0.10%) of water was found to have a viscosity of 1.6 centistokes at 25° C., while an NMP-water mixture containing 2 parts of NMP per one part of water was found to have a higher viscosity (4.6 centistokes at 25° C.). Accordingly, it was surprising that addition of water to monomer-containing Solution A to form monomer-containing Solution C resulted in a decrease in viscosity.

A portion of Solution A was cast on aluminum foil and heated for 5 minutes at 200° C., 5 minutes at 250° C., and 15 minutes at 300° C. The resulting 3-mil cured polymeric film was bubble-free and flexible.

EXAMPLE 10

To 1.94 grams of a solvent mixture containing 0.97 grams of N-methyl pyrrolidone (NMP), containing about 0.05 to 0.1% water, and 0.97 gram of ethylene glycol monomethyl ether (methyl cellosolve) were added with stirring 1.61 gram (0.0029 mole) of 2,2-bis[4-(3,4-dicarboxyphenoxy)phenyl]propane (4,4'-BPATA). Stirring was continued for one hour while maintaining the mixture at about 30° C. After cooling the resulting solution to room temperature (about 23° C.), 0.33 gram (0.00306 mole) of meta-phenylene diamine (M-PD) was added thereto with stirring. The added M-PD dissolved within about 15 minutes, resulting in a clear homogeneous solution (hereinafter referred to as Solution D) containing 50 percent of the M-PD and 4,4'-BPATA monomers. The viscosity of Solution D was 492 centistokes (moderately viscous) at 25° C.

To a portion (2.986 grams) of Solution D was added with stirring 1.06 grams of water, resulting in a very fluid, stable solution containing 36.9 percent monomers, 18.45 percent NMP, 18.45 percent methyl cellosolve, and 26.2 percent of water.

Another portion of Solution D was cast on aluminum foil and heated for 5 minutes at each of the following temperatures in the order given: 125° C., 200° C. and 250° C., followed by heating for 30 minutes at 300° C. The resulting 6-mil cured polymeric film was tough, bubble-free and flexible. The cut-through temperature of this film was 315° C.

EXAMPLE 11

A solution including the following ingredients in the indicated amounts: 1.61 grams (0.0029 mole) of 2,2-bis[4-(3,4-dicarboxyphenoxy)phenyl]propane; 0.638 gram (0.00319 mole) of 4,4'-oxydianiline (ODA); 1.124 grams of diethylene glycol monomethyl ether(methyl carbitol); and 1.124 grams of N-methyl pyrrolidone (NMP) was prepared using the procedure for preparing Solution D in Example 10, except substituting methyl carbitol for methyl cellosolve and ODA for M-PD. The viscosity of this solution (hereinafter referred to as Solution E) was found to be 1078 centistokes at 25° C.

To a 3.13-gram portion of Solution E was added with stirring 0.31 gram of water, resulting in a clear homogeneous aqueous solution, hereinafter referred to as Solution F containing 45.5 percent ODA and 4,4'-BPATA monomers, 45.5 percent organic solvent and 9 percent water. The viscosity of aqueous monomer Solution F was 213 centistokes at 25° C. A portion of Solution F was cast on aluminum foil and heated for 5 minutes at each of the following temperatures in the order given: 100° C., 150° C., 200° C., and 250° C., followed by heating at 300° C. for 30 minutes. The resulting 6-mil cured polymeric film was tough, bubble-free and flexible. The cut-through temperature of this film was 260° C.

Water was slowly added with stirring to a 2.39-gram portion of solution F. The solution being formed was clear and homogeneous throughout until a total of 0.67 gram of water had been added, resulting in development of a faint haze. The solution thus formed, including 35.5 percent monomers, 35.5 percent NMP-methyl carbitol organic solvent component, and 29 percent water, was in a condition of incipient precipitate formation.

EXAMPLES 12-18

In these examples, coating solutions of the present invention including 2,2-bis[4(3,4-dicarboxyphenoxy)-phenyl]propane (4,4'-BPATA), various organic diamines, and various glycol ether solvents, with the monomeric reactants dissolved at high concentrations in the solvents, were prepared using the procedure for preparing Solution A in Example 9. Table III sets forth the ingredients, amounts of ingredients, mole ratios of diamine to 4,4'-BPATA, weight ratios of monomer reactants to organic solvent, solution viscosities and shelf lives. The solutions of Examples 13 to 18 inclusive have suitable viscosities for application thereof to wire using die-coating apparatus well known in the wire enameling art. The very viscous solution of Example 12 is more effectively applied by extrusion. Portions of the solutions of Examples 14 and 16 were cast on aluminum substrates and cured by heating for 5 minutes at each of the following temperatures in the order given: 150° C., 200° C., and 250° C., followed by heating at 300° C. for 30 minutes. The resulting cured polymer films (2 to 3 mils thick) had good flexibility, high cut-through temperatures: 325° C. (Ex. 14) and 320° C. (Ex. 16), and excellent adhesion to the aluminum substrates. Similar results are expected for the other solutions of these examples.

TABLE III

| Example | Organic Solvent | Diamine[a] | Approximate Monomer Mole Ratio[b] | Approx. Weight % Total Monomers | Approx. Weight % Organic Solvent | Approximate Monomer:Organic Solvent Wt. Ratio[c] | Solution Viscosity[d] | Shelf Life[f] |
|---|---|---|---|---|---|---|---|---|
| 12 | methyl cellosolve | MDA | 1.1 | 70 | 30 | 2.33 | [e] | [g] |
| 13 | ethyl cellosolve | MDA | 1.1 | 60 | 40 | 1.50 | 4,580 | not run |
| 14 | ethyl cellosolve | MDA | 1.1 | 54 | 46 | 1.17 | 948 | 1 week |
| 15 | methyl carbitol | MDA | 1.11 | 50 | 50 | 1.00 | 1,940 | >31 days |
| 16 | methyl carbitol | MDA | 1.11 | 47 | 53 | 0.94 | 997 | >31 days |
| 17 | methyl carbitol | ODA | 1.10 | 50 | 50 | 1.00 | 784 | >31 days |
| 18 | butyl carbitol | MDA | 1.10 | 47 | 53 | 0.94 | 4,420 | >32 days |

[a]MDA is 4,4'-methylene dianiline; ODA is 4,4'-oxydianiline
[b]moles of diamine per mole of 2,2-bis[4-(3,4-dicarboxyphenoxy)phenyl]propane
[c]parts of total monomers per one part of organic solvent
[d]centistokes at 25° C.
[e]not run; very viscous by observation (100,000 centistokes estimated)
[f]period of time throughout which the solution remained clear and homogeneous with no observed precipitate or other two-phase formation
[g]initially hazy solution; after 18 days storage, a flexible film was formed by casting and curing the paste on aluminum foil

EXAMPLES 19-25

In Examples 19-24, principal coating solutions identified in Table IV by solely numeric example numbers including 2,2-bis[4-(3,4-dicarboxyphenoxy)phenyl] propane (4,4'-BPATA), various diamines, and various dipolar aprotic organic solvents, with the monomeric reactants dissolved in high concentrations in the solvents, were prepared using the procedure for preparing Solution A in Example 9. Solutions identified by example numbers containing letter suffixes were prepared by adding water or additional organic solvent as indicated in Table IV to the corresponding principal solution and stirring until less concentrated homogeneous solutions resulted. In Example 25, the solution was prepared by initially preparing the 4,4'-BPATA in situ by hydrolysis of the corresponding bis (ether anhydride), 2,2-bis[4-3,4-dicarboxyphenoxy)phenyl] propane dianhydride (4,4'-BPADA). The hydrolysis was effected by heating a mixture of 46.1 parts of 4,4'-BPADA, 44.5 parts of N-N-dimethylformamide, and 9.4 parts of water at about 70° C. for about one-half hour in a sealed container. After cooling the resulting tetra-acid solution to about 45° C., 12.0 parts of meta-phenylenediamine was added with stirring, resulting in formation of a clear homogeneous solution. Table IV sets forth the ingredients, amounts of ingredients, mole ratios of diamine to 4,4'-BPATA, weight ratios of monomer reactants to organic solvent, solution viscosities and shelf lives.

TABLE IV

| Example | Organic Solvent[a] | Diamine[b] | Approximate Monomer Mole Ratio[c] | Approx. Weight % Total Monomers | Approx. Weight % Organic Solvent | Water | Approximate Monomer:Organic Solvent Wt. Ratio[d] | Solution Viscosity[e] | Shelf Life[f] |
|---|---|---|---|---|---|---|---|---|---|
| 19 | DMAC | MDA | 1.1 | 60 | 40 | — | 1.5 | 4,460 | not run |
| 19-A | DMAC | MDA | 1.1 | 54 | 46 | — | 1.17 | 635 | >21 days |
| 19-B | DMAC | MDA | 1.1 | 54 | 36 | 10 | 1.5 | 327 | 4 days |
| 20 | TMU | MDA | 1.1 | 60 | 40 | — | 1.5 | 254,000 | not run |
| 20-A | TMU | MDA | 1.1 | 50 | 50 | — | 1.0 | 3,050 | >21 days |
| 20-B | TMU | MDA | 1.1 | 54 | 36 | 10 | 1.5 | 1,180 | 4 days |
| 21 | DMSO | MDA | 1.13 | 62.3 | 37.7 | — | 1.65 | 1,000[g] | not run |
| 21-A | DMSO | MDA | 1.13 | 34.5 | 65.5 | — | 0.53 | 46 | >30 days |
| 21-B | DMSO | MDA | 1.13 | 38.5 | 49.7 | 11.8 | 0.77 | 45 | >30 days |
| 22 | DMSO | MDA | 1.0 | 54 | 36 | 10 | 1.5 | 392 | 4 days |
| 23 | NMP | ODA | 1.0 | 60 | 40 | — | 1.5 | 113,200 | not run |
| 23-A | NMP | ODA | 1.0 | 54 | 36 | 10 | 1.5 | 958 | >21 days |
| 24 | DMF | MDA | 1.14 | 54 | 46 | — | 1.17 | not run | not run |
| 24-A | DMF | MDA | 1.14 | 40 | 60 | — | 0.67 | 17 | >24 days |
| 25 | DMF | MPD | 1.25 | 54.8 | 39.6 | 5.6 | 1.38 | 349 | >24 days |

[a]DMAC is N,N-dimethylacetamide; TMU is tetramethylurea; DMSO is dimethylsulfoxide; NMP is N-methyl-2-pyrrolidone; DMF is N,N-dimethylformamide
[b]MDA is 4,4'-methylenedianiline; ODA is 4,4'-oxydianiline; MPD is meta-phenylenediamine
[c]moles of diamine per mole of 2,2-bis[4-(3,4-dicarboxyphenoxy)phenyl]propane
[d]parts of total monomers per one part of organic solvent
[e]centistokes at 25° C.
[f]period of time throughout which the solution remained clear and homogeneous with no observed precipitate or other two-phase formation when stored undisturbed at room temperature in a capped container
[g]estimated (not run)

Comparison of Examples 19-A and 19-B with Example 19 shows that dilution with water effects a greater viscosity reduction than dilution with a like amount of additional N,N-dimethylacetamide (DMAC). Comparison of Examples 20-A and 20-B with Example 20 shows that dilution with water in a lesser amount than dilution with tetramethylurea (TMU) nevertheless results in a greater reduction in viscosity. Comparison of Example 21-A with Example 21-B shows that inclusion of water results in essentially the same viscosity at a higher ratio of total monomers to dimethylsulfoxide (DMSO). Comparison of Example 23-A with Example 23 shows the substantial viscosity reduction effected by adding water to an NMP solution of 4,4'-BPATA and 4,4'-oxydianiline (ODA).

Portions of the solutions of Examples 19-A and 25 were cast on aluminum substrates and cured by heating for 5 minutes at each of the following temperatures in the order given: 150° C., 200° C., and 250° C., followed by heating at 300° C. for 30 minutes. The resulting cured polymeric films (2 to 3 mils thick) had good flexibility and excellent adhesion to the aluminum substrates. Similar results are expected for the other solutions of these examples. When the solutions of these examples are cast and cured using the above heating cycle, high cut-through temperatures (e.g. 250° to 300° C. or more) are expected for the resulting polymeric films.

It is understood that the foregoing detailed description is given merely by way of illustration and that numerous modifications may be made therein without departing from the spirit or scope of the present invention.

What is claimed is:

1. A process for coating a substrate, which comprises (I) applying to the substrate a highly concentrated homogeneous coating solution of monomeric bis(ether dicarboxylic acid) and diamine reactants comprising
    (1) at least one aromatic bis(ether dicarboxylic acid) selected from the group consisting of 2,2-bis[4-(3,4-dicarboxyphenoxy)phenyl] propane; 2,2-bis[4-(2,3-dicarboxyphenoxy)phenyl] propane, 4-(2,3-dicarboxyphenoxy)-4'-(3,4-dicarboxyphenoxy)diphenyl-2,2-propane; and mixtures thereof;
    (2) at least one organic diamine selected from the group consisting of 4,4'-methylenedianiline, 4,4'-oxydianiline, m-phenylenediamine, and mixtures thereof; and
    (3) an organic solvent selected from the group consisting of monoalkyl ethers of ethylene glycol having from 1 to 4 carbon atoms in the alkyl group, monoalkyl ethers of diethylene glycol having from 1 to 4 carbon atoms in the alkyl group, dipolar aprotic organic solvents selected from the group consisting of N-methyl-2-pyrrolidone, N,N-dimethylacetamide, dimethylsulfoxide, tetramethylurea, and mixtures thereof;
    said bis(ether dicarboxylic acid) and said diamine being dissolved in said organic solvent in a combined amount of at least 0.67 part by weight per one part by weight of said organic solvent,
    said diamine being dissolved in an amount from about 0.5 to about 2.0 moles per mole of said bis(ether dicarboxylic acid), said solution remaining homogeneous for at least one week when stored at about 20° C. to 30° C. in a tightly stoppered glass container; and thereafter (II) heating the applied solution at a temperature and for a time effective to form a polyetherimide coating on said substrate.

2. The process of claim 1, further including water in an amount up to the maximum amount at which the solution is substantially free of precipitate.

3. The process of claim 1, wherein the substrate is wire.

4. The process of claim 1, wherein the substrate is a coil of insulated wire.

5. The process of claim 1, where the aromatic bis(ether dicarboxylic acid) is a tetra-acid of the formula

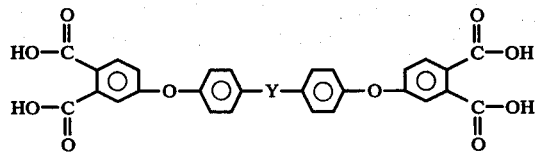

-continued

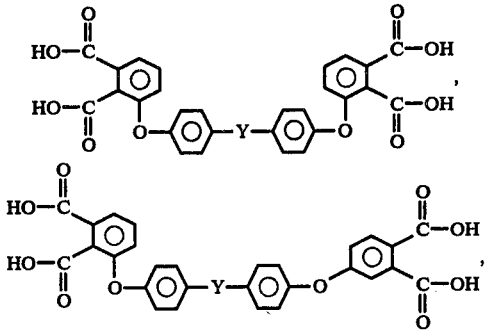

or a mixture of two or more of said tetra-acids, where Y is selected from the group consisting of

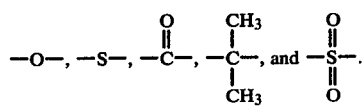

6. The process of claim 1, wherein the aromatic bis(ether dicarboxylic acid) is selected from the group consisting of 2,2-bis[4-(3,4-dicarboxyphenoxy)phenyl] propane; 2,2-bis[4-(2,3-dicarboxyphenoxy)phenyl] propane; 4-(2,3-dicarboxyphenoxy)-4'-(3,4-dicarboxyphenoxy)diphenyl-2,2-propane; and mixtures thereof.

7. The process of claim 1, wherein the aromatic bis(ether dicarboxylic acid) is 2,2-bis[4-(3,4-dicarboxyphenoxy)phenyl] propane.

8. The process of claim 1, wherein the aromatic bis(ether dicarboxylic acid) is 2,2-bis[4-(2,3-dicarboxyphenoxy)phenyl] propane.

9. The process of claim 1, wherein the diamine is selected from the group consisting of 4,4'-methylenedianiline, 4,4'-oxydianiline, m-phenylenediamine, and mixtures thereof.

10. The process of claim 1, wherein the organic solvent component is a dipolar aprotic organic solvent.

11. The process of claim 10, wherein the solvent is selected from the group consisting of N-methyl-2-pyrrolidone; N,N-dimethylformamide; N,N-dimethylacetamide; dimethylsulfoxide; tetramethylurea, and mixtures thereof.

12. The process of claim 1, wherein the organic solvent is selected from the group consisting of monoalkyl ethers of ethylene glycol having from 1 to about 4 carbon atoms in the alkyl group, monoalkyl ethers of diethylene glycol having from 1 to about 4 carbon atoms in the alkyl group, and mixtures thereof.

13. The process of claim 6, wherein the diamine is 4,4'-methylenedianiline and the organic solvent is N-methyl-2-pyrrolidone.

14. The process of claim 1, wherein said solution is applied at a temperature of about 20° to about 40° C.

15. The process of claim 6, wherein the diamine is 4,4'-methylenedianiline and the organic solvent is N,N-dimethylacetamide.

16. The process of claim 6, wherein the diamine is 4,4'-methylenedianiline and the organic solvent is dimethylsulfoxide.

17. The process of claim 6, wherein the diamine is 4,4'-methylenedianiline and the organic solvent is tetramethylurea.

18. The process of claim 6, wherein the diamine is 4,4'-methylenedianiline and the organic solvent is methyl cellosolve.

19. The process of claim 6, wherein the diamine is 4,4'-methylenedianiline and the organic solvent is ethyl cellosolve.

20. The process of claim 6, wherein the diamine is 4,4'-methylenedianiline and the oganic solvent is butyl cellosolve.

21. The process of claim 6, wherein the diamine is 4,4'-methylenedianiline and the organic solvent is methyl carbitol.

22. The process of claim 6, wherein the diamine is 4,4'-methylenedianiline and the organic solvent is ethyl carbitol.

23. The process of claim 6, wherein the diamine is 4,4'-methylenedianiline and the organic solvent is butyl carbitol.

24. The coating process of claim 1, wherein the process viscosity is from about 200 to about 10,000 centistokes at 25° C.

25. The process of claim 1, wherein said bis(ether dicarboxylic acid) and said diamine are dissolved in a combined amount of more than 50 percent by weight of the combined weight of said bis(ether dicarboxylic acid), said diamine, and said organic solvent.

26. The process of claim 1, wherein said diamine is dissolved in an amount from about 1 to about 1.3 moles per mole of said bis(ether dicarboxylic acid).

* * * * *